US009935771B2

(12) United States Patent
Pandrangi et al.

(10) Patent No.: US 9,935,771 B2
(45) Date of Patent: Apr. 3, 2018

(54) METHODS AND SYSTEMS FOR BOOTSTRAPPING (71) Applicant: VERISIGN, INC., Reston, VA (US)

(72) Inventors: Ramakant Pandrangi, Lansdowne, VA (US); Eric Osterweil, Fairfax, VA (US); Paul Livesay, San Carlos, CA (US)

(73) Assignee: VERISIGN, INC., Reston, VA (US)

( * ) Notice: Subject to any disclaimer, the term of this patent is extended or adjusted under 35 U.S.C. 154(b) by 232 days.

(21) Appl. No.: 14/860,885

(22) Filed: Sep. 22, 2015

(65) Prior Publication Data
US 2017/0085380 A1  Mar. 23, 2017

(51) Int. Cl.
*H04L 29/06*  (2006.01)
*H04L 9/32*  (2006.01)

(52) U.S. Cl.
CPC ............ *H04L 9/321* (2013.01); *H04L 9/3263* (2013.01); *H04L 63/123* (2013.01); *H04L 63/20* (2013.01)

(58) Field of Classification Search
None
See application file for complete search history.

(56) References Cited

U.S. PATENT DOCUMENTS

2009/0094347 A1\* 4/2009 Ting .................. G06F 17/30902
709/219
2013/0283041 A1\* 10/2013 Vajirkar .............. H04L 61/1511
713/156

OTHER PUBLICATIONS

Zhou et al., A Secure Domain Name System Based on Intrusion Tolerance, Jul. 2008, Proceedings of the Seventh International Conference on Machine Learning and Cybernetics, Kunming, pp. 3535-3539.\*
Yazir, On the Virtues and Liabilities of ConfiDNS: Can Simple Tactics Overcome Deep Insecurities?, 2007, University of Victoria.\*
Sankararaman et al., TrickleDNS: Bootstrapping DNS Security using Social Trust, 2012, IEEE.\*

(Continued)

*Primary Examiner* — Saleh Najjar
*Assistant Examiner* — Louis Teng
(74) *Attorney, Agent, or Firm* — MH 2 Technology Law Group, LLP (57) ABSTRACT

The disclosure is directed to securely bootstrapping devices in a network environment. Methods and systems include hardware and/or operations for receiving, based on an identifier provisioned at a relying entity, instances of a security credential of an information system, wherein the instances are associated with respective certifying entities. The operations also include verifying the authenticity of the instances of the security credential using information of the certifying entities provisioned at the relying entity. The operations further includes determining matches between the instances of the security credential. Additionally, the operations include determining based on the matches that a first instance of the security credential satisfies a policy provisioned at the relying entity. Further, the operations include verifying the authenticity of information requested from the information system using the first instance of the security credential. In various implementations, the information system may be the domain name system.

17 Claims, 3 Drawing Sheets

(56) References Cited

OTHER PUBLICATIONS

Pathak et al., Byzantine fault tolerant public key authentication in peer-to-peer systems, Aug. 2005, Elsevier, pp. 580-597.*
Awerbuch et al., An On-Demand Secure Routing Protocol Resilient to Byzantine Failures, 2002, ACM, pp. 21-30.*
Osterweil et al., Verifying Keys through Publicity and Communities of Trust: Quantifying Off-Axis Corroboration, Jun. 2013, IEEE, pp. 283-291.*
Huang et al., A Byzantine Resilient Multi-path Key Establishment Scheme and Its Robustness Analysis for Sensor Networks, 2005, IEEE.*
Ahmed, A Scalable Byzantine Fault Tolerant Secure Domain Name System, 2001, Massachusetts Institute of Technology.*

* cited by examiner

METHODS AND SYSTEMS FOR BOOTSTRAPPING

BACKGROUND

The Domain Name System (DNS) is the part of the Internet infrastructure that translates human-readable domain names into the Internet Protocol (IP) numbers needed to establish TCP/IP communications over the Internet. That is, DNS allows users to refer to web sites, and other resources, using memorable domain names, such as "www.en.example.com," rather than the numeric IP addresses, such as "123.4.56.78," which are machine readable addresses used by software to communicate with computers on the Internet. Each domain name is made up of a series of character strings (labels) separated by dots. The right-most label in a domain name is known as the "top-level domain" (TLD). Examples of well-known TLDs are ".com," ".net," ".org." etc. Each TLD supports second-level domains, listed immediately to the left of the TLD, e.g., "example" in "www.example.com." Each second-level domain can support a number of third-level domains located immediately to the left of the second-level domain, e.g., "en" in "www.en.example.com." There can be additional level domains as well. For example, a domain with additional domain levels could be "www.landscape.photos.example.com."

It should be noted that a single IP address, e.g., one assigned to a single server, can support numerous domain names. That is, different domain names may resolve to the same server, and that server can then determine what content to provide based on the requested domain name and/or additional non-domain information. This is sometimes referred to as virtual hosting.

Additional non-domain information may be included in a Uniform Resource Identifier ("URI") structure that includes the domain name. For example, a "path" part of a URI is a sequence of segments separated by a forward slash ("/"). This non-domain information may be included immediately to the right of the domain name, such as the "blog" in "www.example.com/blog/today.htm," and may be used by a server or other receiving device to identify and deliver specific content or run particular code. Other examples of non-domain information may include queries and fragments, the specifics of which are understood by those of ordinary skill in the art and are not discussed in detail herein. Combinations of this information may be included in web page hyperlinks that navigate a user to another section of the same page or to another web page. Thus, as can be seen in the various examples provided above, and as appreciated by those of skill in the art, a domain, such as the second level domain "example.com," may contain a variety of different Internet accessible information with different addresses and other means of identification.

The actual registration of domain names is performed by companies referred to as domain name registrars ("registrars"). Registrars register domain names with registries. For example, an end user submits to a registrar a domain name for registration and provides an IP address to which the domain name should resolve. The registrar communicates with the registry to create a registry database record that can be used by the DNS to resolve the domain name to the IP address provided by the end user and that indicates the identity of the registrar through which the domain name was registered. With the exception of automatic, time-based expiration of the domain name registration at the registry, typically only the registrar designated in the domain name record at the registry can modify or delete registry database information about a domain name. An end user can switch registrars for their domain name(s) by following certain domain transfer procedures. Registrars may also act as a hosting provider, or the end user may have the domain hosted by a separate third-party domain hosting service.

A zone file is a text file that describes a portion of the DNS called a DNS zone. A zone file is organized in the form of resource records (RR) and contains information that defines mappings between domain names and IP addresses and other resources. The format of zone files is defined by a standard, with each line typically defining a single resource record. A line begins with a domain name, but if left blank, defaults to the previously defined domain name. Following the domain name is the time to live (TTL), the class (which is almost always "IN" for "internet" and rarely included), the type of DNS resource record (A, MX, SOA, etc.), followed by type-specific data such as the IPv4 address for A records. Comments can be included by using a semi-colon and lines can be continued by using parentheses. There are also file directives that are marked with a keyword starting with a dollar sign.

The DNS distributes the responsibility of assigning domain names and mapping those names to IP addresses by designating authoritative name servers for each domain. Authoritative name servers are assigned to be responsible for their particular domains, and in turn can assign other authoritative name servers for their sub-domains. This mechanism generally helps avoid the need for a single central register to be continually consulted and updated. The DNS resolution process allows for users to be directed to a desired domain by a reverse lookup process whereby the user enters the desired domain, and the DNS returns appropriate IP numbers. During the DNS resolution process, a request for a given domain name is routed from a resolver (e.g. a stub resolver) to an appropriate server (e.g. a recursive resolver) to retrieve the IP address. To improve efficiency, reduce DNS traffic across the Internet, and increase performance in end-user applications, the DNS supports DNS cache servers that store DNS query results for a period of time determined by the time-to-live (TTL) of the domain name record in question. Typically, such caching DNS servers, also called DNS caches, also implement the recursive algorithm necessary to resolve a given name starting with the DNS root through to the authoritative name servers of the queried domain. Internet service providers (ISPs) typically provide recursive and caching DNS servers for their customers. In addition, home networking routers may implement DNS caches and proxies to improve efficiency in the local network.

Although the distributed nature of the DNS provides significant advantages in terms of the efficiency of the overall system, it also makes the system vulnerable to certain types of malfunctions and/or attacks at various nodes in the system. One particular problem that can occur is referred to as DNS cache poisoning. DNS cache poisoning occurs when data are introduced into a DNS name server's cache database that did not originate from authoritative DNS sources. This may result from deliberate attacks on a name server, or it may be an unintended result of, for example, a misconfigured DNS cache, or improper software design of a DNS applications. Thus, DNS cache poisoning can result in (1) resolution requests failing, such as when inaccurate or misconfigured IP address information is provided, or (2) a requesting user's resolution request being directed to a malicious site that spoofs the genuine domain and is used to illicitly obtain information such as account passwords, or to distribute malicious content, such as computer worms or viruses, that are delivered to the requesting user.

The Domain Name System Security Extensions (DNSSEC) is a suite of Internet Engineering Task Force (IETF) specifications for securing certain kinds of information provided by the DNS as used on IP networks. DNSSEC provides for the cryptographically signing of DNS-ready zone files, ensuring origin authentication and data integrity for DNS data, as well as authenticated denial of existence. In general, answers provided within DNSSEC are digitally signed, and, by checking the digital signature, a DNS resolver is able to check if the information corresponds to the information on the authoritative DNS server. DNSSEC uses public-key cryptography for the digital signatures and authentication. The DNSKEY record is authenticated via a chain of trust, starting with a set of verified public keys for the DNS root zone, which is a trusted third party.

To implement DNSSEC, several new DNS record types were created or adapted to use with DNSSEC, including RRSIG, DNSKEY, DS, NSEC, NSEC3, and NSEC3PARAM. For example, when DNSSEC is used, each authoritative answer to a DNS lookup will contain an RRSIG DNS record in addition to the record type that was requested. The RRSIG record is a digital signature of the answer DNS resource record set. The digital signature can be verified by locating the correct public key found in a DNSKEY record. The DS record is used in the authentication of DNSKEYs in the lookup procedure using the chain of trust. NSEC and NSEC3 records are used to provide the authenticated denial of existence responses for DNS records that do not exist.

The requirements of DNSSEC involve the use of different keys, stored both in DNSKEY records and from other sources to form trust anchors. There are, for example, Key Signing Keys (KSKs), which are used to sign other DNSKEY records, and Zone Signing Keys (ZSKs), which are used to sign other records. Because the ZSKs are under the control and use of a specific DNS zone, they can be switched more easily and more often. As a result, ZSKs can generally be much shorter (in terms of byte length) than KSKs, while still offering an acceptable level of protection.

Although protocols have been developed for the employment of DNSSEC, including the use of KSKs and ZSKs, there are numerous aspects of operating DNSSEC enabled domains, at the registrar and registry levels, that have not been addressed and/or optimized for large-scale use. For example, the entities (e.g., devices) that interact with the DNSSEC-enable DNS must obtain credentials (e.g., keys) required to decrypt RRSIG DNS records. However, an entity may lack such credentials or the credentials it possesses may be outdated. Accordingly, there is a need for a secure and reliable method for entities to obtain authentic credentials.

SUMMARY

In accordance with aspects of the present disclosure, a method for bootstrapping a relying entity is provided. The method includes receiving, based on an identifier provisioned at the relying entity, instances of a security credential of an information system, wherein the instances are associated with respective certifying entities. The method also includes verifying the authenticity of the instances of the security credential using information of the certifying entities provisioned at the relying entity. The method further includes determining matches between the instances of the security credential. Additionally, the method includes determining based on the matches that a first instance of the security credential satisfies a policy provisioned at the relying entity. Further, the method includes verifying the authenticity of information requested from the information system using the first instance of the security credential.

In accordance with aspects of the present disclosure, a system for bootstrapping a relying entity is provided. The system performs operations including receiving, based on an identifier provisioned at the relying entity, instances of a security credential of an information system, wherein the instances are associated with respective certifying entities. The operations also include verifying the authenticity of the instances of the security credential using information of the certifying entities provisioned at the relying entity. The operations further include determining matches between the instances of the security credential. Additionally, the operations include determining based on the matches that a first instance of the security credential satisfies a policy provisioned at the relying entity. Further, the operations include verifying the authenticity of information requested from the information system using the first instance of the security credential.

In accordance with aspects of the present disclosure, an information system that performs operations including maintaining a lookup table associating an identifier of a relying entity with instances of a security credential of the information system. The instances of the security credential are cryptographically signed by respective certifying entities. The operations also include providing, using the lookup table, the relying entity the instances of the security credential in response receiving the unique identifier of the relying entity in a bootstrapping request from the relying entity.

In embodiments of the present disclosure, the information system can be the Domain Name System (DNS) of the Internet. Also, in embodiments the relying entity can be an Internet-enabled device. Additionally, in embodiments the identifier of the relying entity unambiguously identifies the relying entity in the DNS. Further, in embodiments the instances of the security credential are instances of a DNSSEC root key. Moreover, in embodiments, the certifying entities are trusted third party certificate authorities operated independently of each other and independently of the information system.

DRAWINGS

The present invention will become more fully understood from the detailed description and the accompanying drawings, wherein.

DETAILED DESCRIPTION

The present disclosure is directed to network security and, more particularly, to securely bootstrapping devices in a network environment. Systems, methods, and computer-readable storage devices in accordance with aspects of the present disclosure bootstrap and/or modify security credentials for an information system at an entity that relies on the authenticity of information provided by the information system (i.e., a relying entity). In embodiments, the information system can be the DNS, the security credential can be a key of a root domain (e.g., a DNSSEC root key, also known as the DNSSEC root KSK) and the relying entity can be a component (e.g., system, device, software, or a combination thereof) that uses the root key to verify information obtained from the DNS.

In embodiments consistent with the present disclosure, the relying entity is provisioned with an identifier (e.g., a DNS domain name) and a set of verification credentials (such as cryptographic keys) for certifying entities (e.g., X.509 certificate authorities), which are independent from the information system and from one another. The identifier can be used as an association between the relying entity, and as a security credential the relying entity needs to verify the authenticity of information obtained from the information system. For example, the relying entity may be an Internet-enabled device that needs to obtain a valid, current version of a DNSSEC root key after being manufactured and being shelved for a long period of time before activation.

To bootstrap itself with a current version of the security credential for the information system, the relying entity can send a bootstrapping request to the information system that includes its identifier. The information system stores predetermined information that directly or indirectly maps the identifier with the security credential. The information system responds to the request by sending a set comprised of different instances of the security credential, wherein each instance is cryptographically signed by a different one of the certifying entities attesting to the validity of the respective instance of the security credential.

After receiving the response from the information system, the relying entity decrypts and/or verifies the security credential using the keys provisioned at the relying entity. The relying entity then determines whether the security credential matches among the different instances. In some embodiments, the determination could use a Byzantine fault tolerance policy (e.g., at least a majority of certifying entities agree, or >⅔ agreement, etc.). Because it is extraordinarily unlikely that an error or a malefactor could corrupt more than one of the independent certifying entities, let alone a majority of them, the relying entity can safely conclude that the instance of the security credential which matched among the different instances signed by the certifying entities is correct. Accordingly, the relying entity can store that instance of the security credential for performing future operations with the information system.

In an exemplary implementation, the information system can be the DNS and the certifying entities can be X.509 certificate authorities. The namespace of the DNS can be used to provide a set of different instances of a DNSSEC root key, each of which is signed by the X.509 certificate authorities, which are non-DNS entities. To obtain the DNSSEC root key, the relying entity can issue a DNS query for the relying entity's identifier. Using X.509 certificates, the certificate authorities can each provide a respective signed instance of the current DNSSEC root key. The certificate authorities can obtain the DNSSEC root key from a trusted source (e.g., from a root authority). Because the certificate authorities operate as trusted third parties, it is highly unlikely that more than one will ever be corrupted with a fake root key. The DNS can respond to the query by providing the set of the signed instances of the current DNSSEC root key to the relying entity. Each instance is similar to a vote by each of the certificate authorities as to the correct value of the DNSSEC root key. After decrypting the signed instances of the current DNSSEC root key using the pre-provisioned keys of the X.509 certificate authorities, the relying entity can perform a client-side verification by selecting an instance of the DNSSEC root key which matches among the X.509 certificate authorities (e.g., by selecting a DNSSEC root key that matches among a majority in the set, or using Byzantine fault tolerance). In this manner, the relying entity can bootstrap itself with an authentic, current DNSSEC root key.

After obtaining, the DNSSEC root key, the relying entity can verify information obtained from the DNS because the DNSSEC root key is self-validating. That is, once the valid DNSSEC root key is obtained by the relying entity, it can be used to perform other trusted/cryptographic operations with the DNS. In embodiments, the valid root key can be used to update the certification authority table in the relying entity. For example, once the relying entity can verify firmware (or BIOS, or any other code), it can build secure applications on top of that, etc.

Advantageously, independent certification architectures, such as X.509, are not vulnerable to the same compromises of common infrastructures, such as DNSSEC. And, because DNSSEC and the X.509 hierarchies are independent, their security is complementary. Thus, using X.509 to verify the DNSSEC root key in accordance with aspects of the present disclosure provides for secure, client-side bootstrapping of security credentials that avoids cyclic dependencies. Thus, embodiments disclosed herein enable devices having self-securing hardware, and the building of secure stacks.

Figure 1:
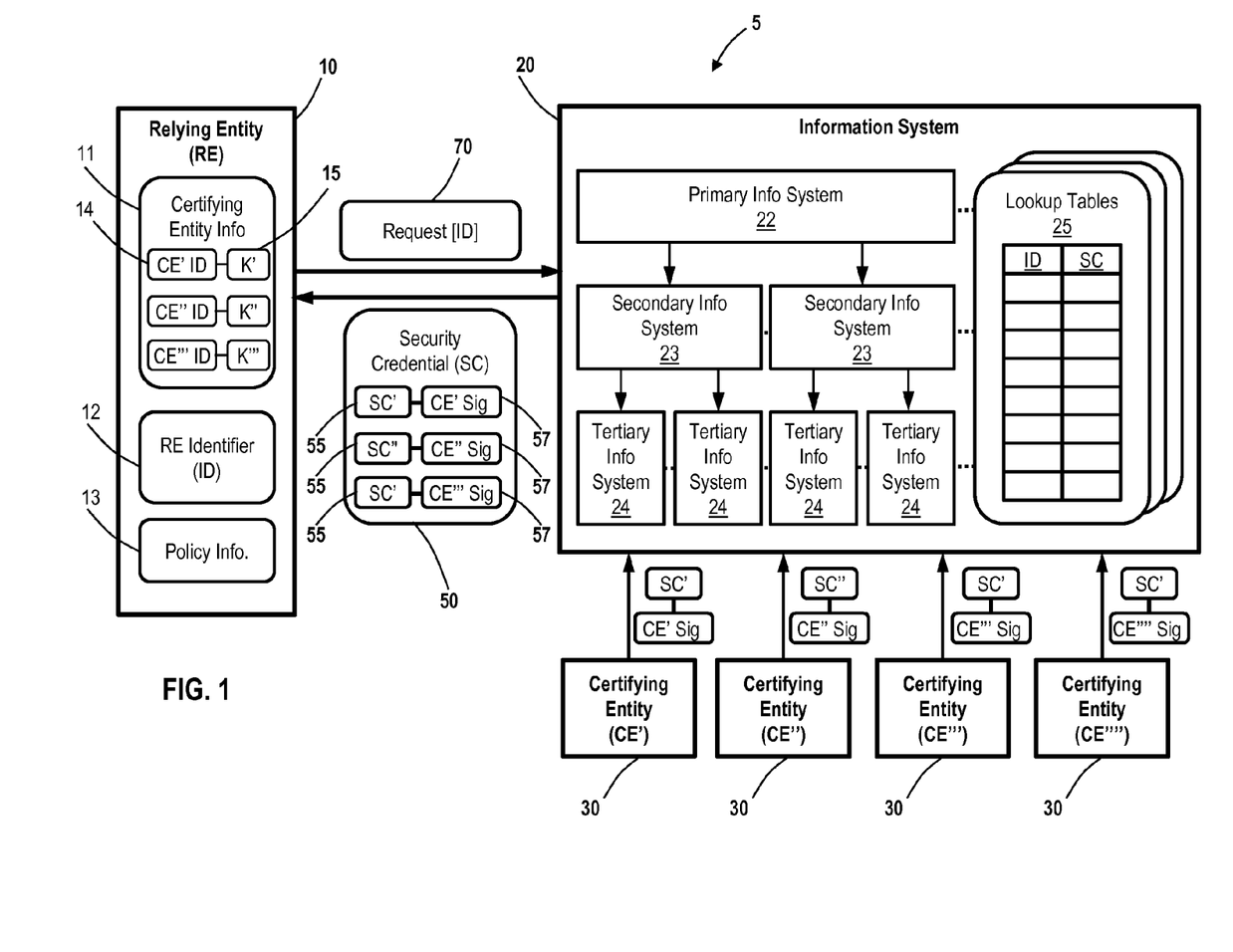
FIG. 1 illustrates a block diagram of an example of an environment for implementing systems and processes in accordance with aspects of the present disclosure.

FIG. 1 illustrates a block diagram of an example of an environment 5 for implementing systems and processes in accordance with aspects of the present disclosure. The environment 5 includes a relying entity 10 (i.e., RE), an information system 20, and certifying entities 30 (i.e., CE', CE'', CE''', and CE''''). The relying entity 10 can be a device, software, or combinations thereof that use information obtained from the information system 20 and rely on the authenticity of that information to avoid malicious information or activity (e.g., malware and cybersecurity attacks).

In accordance with aspects of the present disclosure, the relying entity 10 includes certifying entity information 11, an identifier 12 (i.e., ID), and policy information 13. In accordance with aspects of the present disclosure, the relying entity 10 can be provisioned with the certifying entity information 11, the identifier 12, and the policy 13 prior to being fielded. For example, the relying entity 10 can be a computing device having non-volatile memory, wherein the certifying entity information 11, the identifier 12, and the policy 13 are stored when the relying entity 10 is manufactured, fielded, or reset. Additionally, in some embodiments, the certifying entity information 11, the identifier 12, and the policy information 13 can be provisioned to the relying entity 10 by a technician during a field upgrade. The certifying entity information 11 stores associations between certifying entity identifiers 14 (i.e., CE' ID, CE'' ID, and CE''' ID) and respective keys 15 (i.e., K', K'', and K'''). The identifier 12 stores a name of the relying entity 10 (e.g., a DNS domain name) that can be unambiguously discovered and verified from the information system 20 (e.g., using the DNS). In embodiments, the name is a unique identifier of the relying entity 10. In other embodiments, the name is unique to a family of relying entities (e.g., computing devices in a DNS domain). The policy information 13 stores a policy for selecting security credentials provided by the certifying entities 30. For example, the policy can be a Byzantine Fault Tolerance rule.

The information system 20 is a system of computing devices that provide information to users, including the relying entity 10. In some embodiments, the information system 20 is a hierarchical system of information system providers, including a primary information system 22, secondary information systems, 23, and tertiary information systems 24, that store information in a distributed manner. For example, the information system 20 can implement the infrastructure of the Internet, e.g., the DNS, wherein the primary information system 22 is a root domain server of the DNS, the secondary information systems 23 are top level domain servers of the DNS, and tertiary information systems 24 are sub-domain servers of the DNS delegated by the top level domains. It will be understood that the information system 20 illustrated in FIG. 1 is a simplified example provided for clarity of illustration and that different, more complex implementations are within the scope of the present disclosure. Embodiments disclosed herein are not limited to particular hierarchical structure shown in FIG. 1. It us understood that the information system 20 can have other structures. For example, embodiments of the information system 20 can include numerous instances of the elements in each layer of the structure that provide various services, as well as numerous links, switches, routers, and caches for directing messages among the layers and their components, and the like.

The certifying entities 30 are entities trusted by both the relying entity 10 and the information system 20 (e.g., trusted third parties) that issue cryptographic material for use by other entities (e.g., relying entity 10). In accordance with aspects of the present disclosure, the certifying entities 30 are independent of one another. In embodiments, the certifying entities 30 are independent because they employ separate physical architectures, protocols (cryptographic, network, and systems), operational management, and/or administrative deployments. In embodiments, greater than two-thirds of the certifying entities 30 are operated by respective operators which are separate and independent of the operator of the information system. For example, each of the certifying entities 30 can be operated by certification authorities in a public-key infrastructure, wherein each of the certification authorities are independently owned and operated. It will be understood that FIG. 1 shows only four certifying entities 30 for the sake of illustration. In accordance with aspects of the invention, there can be greater than four certifying entities 30, of which at least three are identified in the certifying entity information 11 at the relying entity 10. Examples of certifying entities 30 include DIGICERT, INC., GLOBALSIGN, GODADDY, COMODO GROUP, INC., and SYMANTEC CORP.

Still referring to the example of FIG. 1, the relying entity 10 uses the certifying entity information 11, the identifier 12, and the policy information 13 to obtain a set of signed security credentials 50 for the information system 20 by transmitting a request 70 (such as during initialization or startup) to the information system 20. For example, the relying entity 10 may be a computing device that sends the request 70 as part of an initial bootstrapping process during initial use or after being restored to factory settings. In accordance with aspects of the present disclosure, the request 70 includes the identifier 12 of the relying entity 10. The identifier 12 serves as a reference (e.g., a pointer to the location of information), which the information system 20 maps (directly or indirectly) to instances of the security credential 55 encrypted (and/or signed) 57 by the certifying entities 30. For example, the information system 20 maintains one or more lookup tables 25 associating the identifier 12 with instances of the security credentials 55 that are signed by the certifying entities 30. It will be understood that the one or more lookup tables 25 can store associations between identifiers and security credentials for many entities similar to relying entity 10. Each of the one or more lookup tables 25 can correspond, respectively, to one or more of the primary information system 22, the secondary information systems 23, and the tertiary information systems 24, such that the security credentials can be located by recursive searching among the one or more lookup tables 25.

The information system 20 responds to the request 70 by transmitting at least three instances of the same security credential 55, each instance having been signed with a different signature 57 (e.g., CE' Sig, CE" Sig, CE'" Sig) of a respective one of the certifying entities 30. For example, as illustrated in FIG. 1, the information system 20 can respond to the request 70 by using the one or more lookup tables 25 to identify the set of signed security credentials 50, and provide the set of signed security credentials 50 to the relying entity 10. It is noted FIG. 1 shows the set of signed security credentials 50 as a single unit for the sake of illustration. However, it is understood that the security credentials 55 and certifying entity signatures 57 can be received at different times and/or in different messages.

In the example illustrated in FIG. 1, the set of signed security credentials 50 includes two instances of SC' and one instance of SC", which are each instances of the same security credential signed with respective signatures 57 (e.g., CE' Sig, CE" Sig, CE'" Sig) of different certifying entities 30 (e.g., CE', CE", and CE'"). Ideally, where no corruption or errors have occurred, each instance of the security credential 55 (e.g., SC', SC", SC') would be the same. However, in the present example, SC" is different from SC', which indicates that at least one is erroneous or has been corrupted.

In accordance with aspects of the present disclosure, the relying entity 10 receives the set of signed security credentials 50 from the information system 20, and none of the individual security credentials 55 are undoubtedly authentic or uncorrupted. However, the signatures 57 (e.g., CE' Sig, CE" Sig, and CE'" Sig) from the independent certifying authorities 30 (e.g., CE', CE", and CE'") each attest to the authenticity of its corresponding security credential 55 (e.g., SC', SC", and SC'). While it is possible for errors or malefactors (e.g., criminals, hackers, spies) to corrupt a security credential 55 provided from a particular certifying entity 30 (e.g., CE" in this example), it is extremely unlikely that such an error or malefactor could comprises more than one of the certifying authorities 30, much less a majority of the certifying entities 30. Accordingly, even if one or more instances of the security credentials 55 from the certifying entities 30 are corrupted (e.g., SC" in this example), a threshold number (e.g., $>\frac{1}{2}$ or $\geq\frac{2}{3}$) of the certifying entities 30 (e.g. CE' and CE'") provide uncorrupted instances of the security credential 55 that match each other (e.g., SC' signed by CE' Sig and SC' signed by CE'" Sig). Thus, the relying entity 10 can conclude that the matching instances of the security credential (e.g., SC' from CE' and SC' from CE'") are authentic.

Using the keys 15 (e.g., K', K", and K'"), the relying entity 10 can decrypt and/or verify the authenticity of each instance of the security credential 55. Then, using policy information 13, the relying entity 10 can determine to accept one instance of the security credential 55 (e.g., SC') because a predetermined sufficient number of the instances of the security credential 55 match (e.g., $\geq\frac{2}{3}$ match). Thereafter, the relying entity 10 can use the matching instance of the security credential 55 (e.g., SC') to authenticate information received from the information system.

Figure 2:
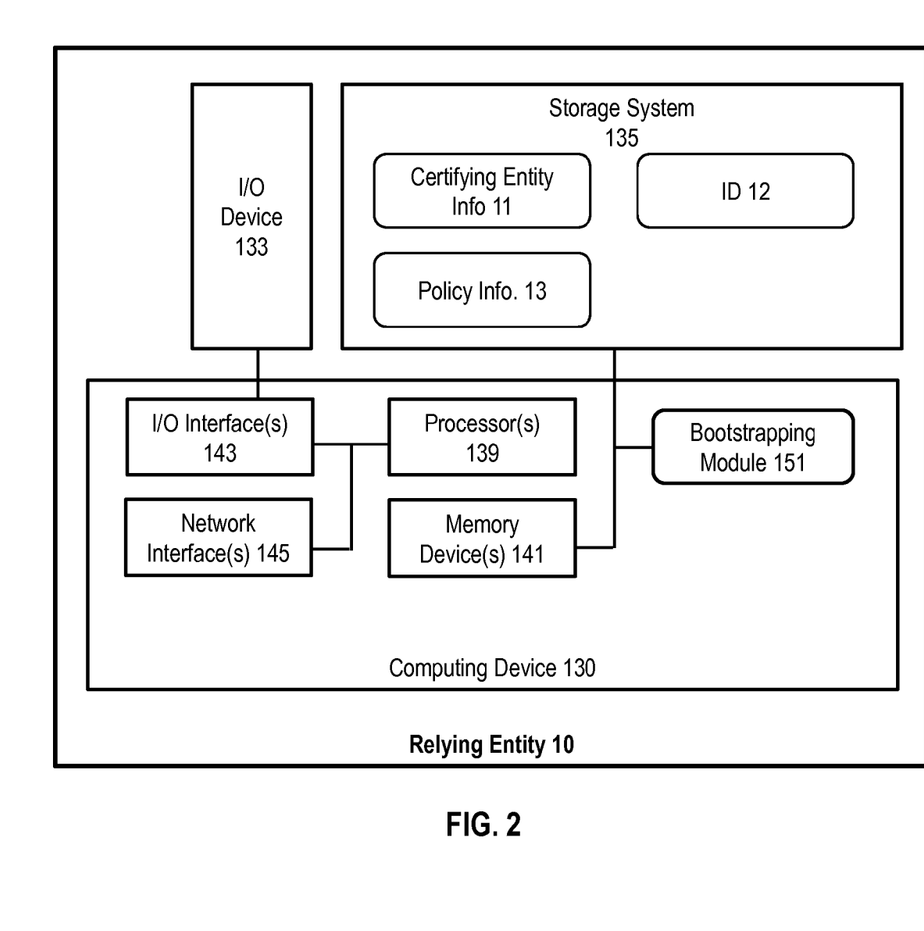
FIG. 2 illustrates a system block diagram of an example of a relying entity in accordance with aspects of the present disclosure.

FIG. 2 illustrates a system block diagram of a relying entity 10 in accordance with aspects of the present disclosure. The relying entity 10 can be the same or similar to that previously described herein. The relying entity 10 includes hardware and software that perform the processes and functions described herein. In particular, the relying entity 10 includes a computing device 130, an input/output (I/O) device 133, and a storage system 135. The I/O device 133 can include any device that enables an individual to interact with the computing device 130 (e.g., a user interface) and/or any device that enables the computing device 130 to communicate with one or more other computing devices using any type of communications link. The I/O device 133 can be, for example, a touchscreen display, pointer device, keyboard, etc.

The storage system 135 can comprise a computer-readable, non-volatile hardware storage device that stores information and program instructions. For example, the storage system 135 can be one or more flash drives and/or hard disk drives. In accordance with aspects of the present disclosure, the storage device 135 stores certifying entity information 11 identifier 12, and policy information 13, which can be the same or similar to those previously described herein.

In embodiments, the computing device 130 includes one or more processors 139 (e.g., microprocessor, microchip, or application-specific integrated circuit), one or more memory devices 141 (e.g., RAM and ROM), one or more I/O interfaces 143, and one or more network interfaces 144. The memory device 141 can include a local memory (e.g., a random access memory and a cache memory) employed during execution of program instructions. Additionally, the computing device 130 includes at least one communication channel (e.g., a data bus) by which it communicates with the I/O device 133, the storage system 135, and the device selector 137. The processor 139 executes computer program instructions (e.g., an operating system and/or application programs), which can be stored in the memory device 141 and/or storage system 135.

Moreover, the processor 139 can execute computer program instructions of a bootstrapping module 151. In accordance with aspects of the present disclosure, the bootstrapping module 151 uses the identifier 12 to request security credentials. Also, the bootstrapping module 151 uses the certifying entity information 11 to processes signatures received certifying entities to decrypt the information contained therein. Further, the bootstrapping module 151 uses the policy information 13 to determine whether to accept a security credential instance for use, for example by determining that a threshold number of instances of the security credentials match each other.

It is noted that the computing device 130 can comprise any general purpose computing article of manufacture capable of executing computer program instructions installed thereon (e.g., a personal computer, server, etc.). However, the computing device 130 is only representative of various possible equivalent-computing devices that can perform the processes described herein. To this extent, in embodiments, the functionality provided by the computing device 130 can be any combination of general and/or specific purpose hardware and/or computer program instructions. In each embodiment, the program instructions and hardware can be created using standard programming and engineering techniques, respectively.

Figure 3:
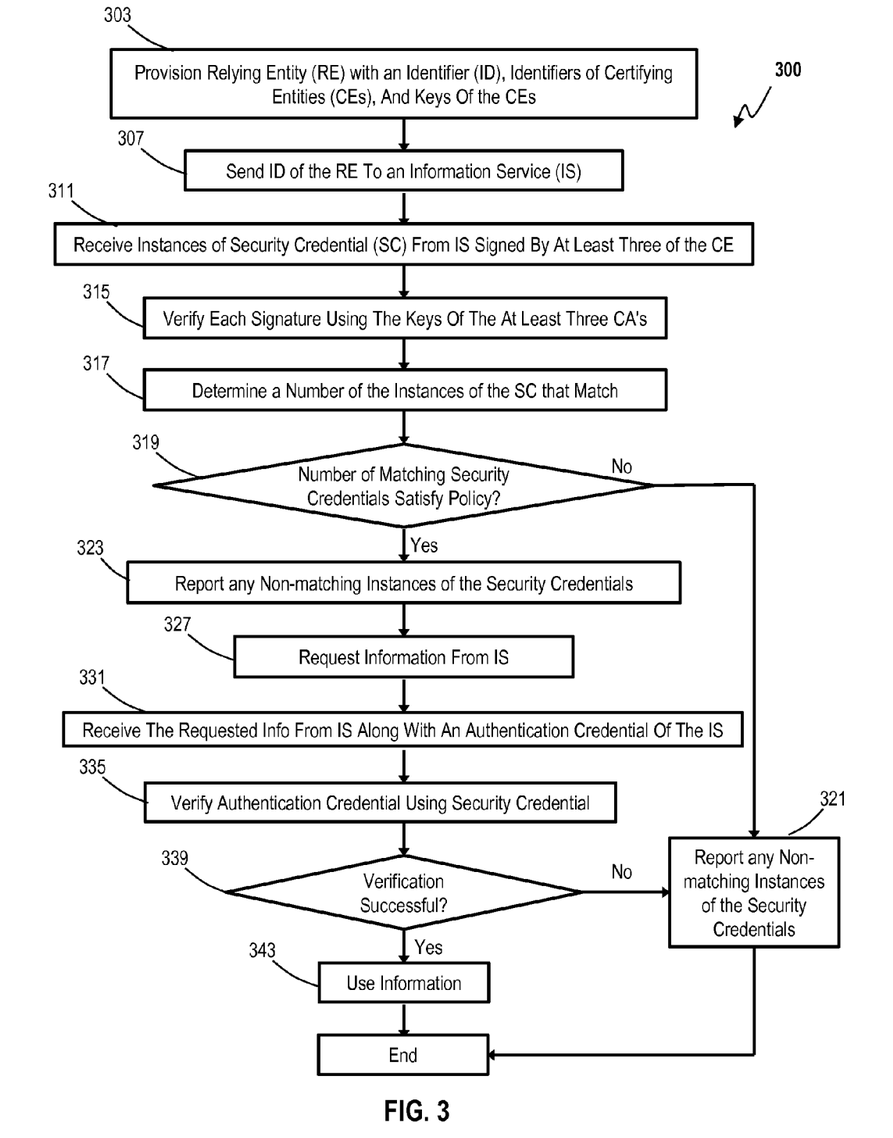
FIG. 3 illustrates a flow diagram of an example of a process in accordance with aspects of the present disclosure.

The flow diagram in FIG. 3 illustrates an example of the functionality and operation of a possible implementation of systems, devices, methods, and computer program products according to various embodiments of the present disclosure.

Each block in the flow diagram of FIG. 3 can represent a module, segment, or portion of program instructions, which includes one or more computer executable instructions for implementing the illustrated functions and operations. In some alternative implementations, the functions and/or operations illustrated in a particular block of the flow diagram can occur out of the order shown in FIG. 3. For example, two blocks shown in succession can be executed substantially concurrently, or the blocks can sometimes be executed in the reverse order, depending upon the functionality involved. It will also be noted that each block of the flow diagram and combinations of blocks in the block can be implemented by special purpose hardware-based systems that perform the specified functions or acts, or combinations of special purpose hardware and computer instructions.

FIG. 3 illustrates a flow diagram of an example of a process 300 in accordance with aspects of the present disclosure. At 303, the relying entity (e.g., relying entity 10) is provisioned with information including an identifier (e.g., ID 12) and certifying entity information (e.g., certifying entity information 11) of certifying entities (e.g., certifying entities 30). The provisioning may occur, for example, during manufacture, fielding, resetting, and/or upgrading of the relying entity. The certifying entity information 11 can include identifiers of the certifying entities (e.g., certifying entity identifiers 14) (e.g., semantic names and/or Internet protocol addresses) and respective keys (e.g., keys 15) of the certifying entities. In embodiments, the certifying entities are certification authorities of a PKI, and the keys are the public keys of the certification authorities.

At 307, the relying entity provisioned at 303 sends a request (e.g., request 70) including the identifier to an information system (e.g., information system 20). The relying entity can send the request as part of an automated initialization process that is triggered after the relying entity is started (e.g., powered-on), after being initially fielded after manufacture, after being reset to initial factory configuration, and/or after being upgraded to a new configuration. In embodiments, the information system is the DNS and the ID of the relying entity is a name of the relying entity that is registered with the DNS (e.g., in lookup tables 25).

In various implementations, in response to the request, the information system retrieves instances (e.g., versions) of a security credential for the information system (e.g., a DNS-SEC root key), each of which instance is signed by a different one of the certifying entities identified in the certifying entity information provisioned at 303. For example, the information system can recursively search for the security credentials among hierarchical tiers of the information system (e.g., primary information system 22, secondary information systems 23, and tertiary information systems 24).

At 311, in response to the request sent at 307, the relying entity receives the set of signed security credentials (e.g., set of signed security credentials 50). As noted above, the set includes instances of a security credential associated with the ID from the information system along with respective signatures from a set of certifying entities.

At step 315 the relying entity performs a verification of each signature received at 311. For example, referring to FIG. 1, the relying entity verifies the signatures (e.g., CE' SIG, CE" SIG, AND CE'" SIG) associated with each of the security credentials received in the set (e.g., SC', SC", and SC') using the corresponding keys (e.g., K', K", and K'") that were provisioned at 303. As discussed previously, each of the signatures attests to the validity of the associated instance of the security credential. However, it is possible that one or some minority of the instances of the security credentials was corrupted by an error or a malefactor.

At 317, the relying entity determines a number of the instances of the security credential that match. At 319, the relying entity determines the number of instances of the security credential that match determined at 317 satisfy a policy (e.g., policy information 13). The policy can be, for example, a Byzantine Fault Tolerance (BFT) rule. In other embodiments, the policy may require that a percentage of the security credentials instances match, (e.g., >½ or ≥⅔). If the relying entity determines that an insufficient number of the instances of the security credential match one another (step 319, "no"), then at 321 the relying entity can report the identities of all certifying entities that provided non-matching security credentials to the information system and/or the corresponding certifying entities, and the process 300 ends. If, on the other hand, the relying entity determines that a sufficient number of the instances of the security credential match one another (step 319, "yes"), then at 323 the relying entity can report the identities of any certifying entities that provided non-matching security credentials to the information system and/or the corresponding certifying entities, and the relying entity accepts the validity of one or more instances of the security credential based on the policy and, thus, uses that instance for further operations with the information system.

At 327, the relying entity requests information from the information system. For example, the information system can be the DNS, and the relying entity may send a domain name resolution request to the DNS. At 331, the relying entity receives the requested information from the information system along with an authentication credential of the information system. For example, the relying entity can receive a response to the domain name resolution request to the DNS and the authentication credential can be a DNSSEC trust chain for the request.

At 335, the relying entity verifies the authentication credential using the security credential verified at 317 and 319. If the verification fails (i.e., step 339, "No"), the relying entity reports the failure to the information system, and the process ends. If, on the other hand, the verification is successful (i.e., 339, "Yes"), the relying entity uses the verified information. For example, the relying entity can subsequently use the security credential from the information system to authenticate subsequent information from the information system. Additionally, relying entity can use the security credential to update its stored information of certifying entities and/or the associated keys of the certifying entities (e.g., certifying entity information 11).

As detailed above, the process 300 enables the relying entity to bootstrap itself with a valid security credential, which may be a DNSSEC root key. Because the security credential is attested to by the certifying entities, the relying entity can rely on its validity without the security credential being authenticated. And in embodiments, where the security credential is a DNSSEC root key (which is self-validating in the DNS), it can be used to perform other trusted/cryptographic operations with the DNS without further validation.

The invention claimed is:

1. A method for bootstrapping a relying entity comprising:
receiving, based on an identifier provisioned at the relying entity, a plurality of instances of a security credential of an information system, the plurality of instances of the security credential being associated, respectively, with a plurality of certifying entities, wherein the information system is the Domain Name System (DNS) and the security credential is a Domain Name System Security Extensions root key;
verifying, by a processor, authenticity of the plurality of instances of the security credential using information of the plurality of certifying entities provisioned at the relying entity;
determining, by the processor, matches between the plurality of instances of the security credential;
determining, by the processor, based on the matches, that a first instance of the security credential in the plurality of instances of the security credential satisfies a policy provisioned at the relying entity; and
verifying, by the processor, authenticity of information requested from the information system using the first instance of the security credential.

2. The method of claim 1, further comprising sending a bootstrapping request including the identifier to the information system.

3. The method of claim 1, further comprising reporting to the information system a non-matching instance of the security credential of the plurality of instances of the security credential.

4. The method of claim 1, wherein the information of the plurality of certifying entities comprises identifiers of the plurality of certifying entities and cryptographic keys of the plurality of certifying entities.

5. The method of claim 4, wherein the plurality of certifying entities are trusted third party certificate authorities and the cryptographic keys of the plurality of certifying entities comprise public keys of the trusted third party certificate authorities.

6. The method of claim 1, wherein the plurality of certifying entities are independent of one another.

7. The method of claim 1, wherein the policy comprises a Byzantine fault tolerance policy.

8. The method of claim 1, wherein the identifier provisioned at the relying entity unambiguously identifies the relying entity in the information system.

9. A system for bootstrapping a relying entity comprising a processor, a data storage device, and program instructions stored on the data storage device that, when executed by the processor, control the system to perform operations comprising:
receiving, based on an identifier provisioned at the relying entity, a plurality of instances of a security credential of an information system, the plurality of instances of the security credential being associated, respectively, with a plurality of certifying entities, wherein the information system is the Domain Name System (DNS) and the security credential is a Domain Name System Security Extensions (DNSSEC) root key;
verifying authenticity of the plurality of instances of the security credential using information of the plurality of certifying entities provisioned at the relying entity;
determining matches between the plurality of instances of the security credential;
determining, based on the matches, that a first instance of the security credential of the plurality of instances of the security credential satisfies a policy provisioned at the relying entity; and
verifying authenticity of information requested from the information system using the first instance of the security credential.

10. The system of claim 9, wherein the operations further comprise sending a bootstrapping request including the identifier to the information system.

11. The system of claim 9, wherein the operations further comprise reporting a non-matching instance of the security credential of the plurality of instances of the security credential to the information system.

12. The system of claim 9, wherein the information of the plurality of certifying entities comprises identifiers of the plurality of certifying entities and cryptographic keys of the plurality of certifying entities.

13. The system of claim 12, wherein the plurality of certifying entities are trusted third party certificate authorities and the cryptographic keys of the plurality of certifying entities comprise public keys of the trusted third party certificate authorities.

14. The system of claim 9, wherein the plurality of certifying entities are independent of one another.

15. The system of claim 9, wherein the policy comprises a Byzantine fault tolerance policy.

16. The system of claim 9, wherein the identifier provisioned at the relying entity unambiguously identifies the relying entity in the information system.

17. An information system comprising a processor, a data storage device, and program instructions stored on the data storage device that, when executed by the processor, control the system to perform operations comprising:

maintaining one or more lookup tables associating a unique identifier of a relying entity with a plurality of instances of a security credential of the information system, the plurality of instances of the security credential being cryptographically signed by a respective plurality of certifying entities; and providing, using the one or more lookup tables, the relying entity the plurality of instances of the security credential in response to receiving the unique identifier of the relying entity in a bootstrapping request from the relying entity, wherein the information system is the Domain Name System (DNS) of the Internet;

the relying entity is an Internet-enabled device;

the identifier of the relying entity unambiguously identifies the relying entity in the DNS;

the plurality of instances of the security credential of the information system are a plurality of instances of a Domain Name System Security Extensions root key; and the certifying entities are trusted third party certificate authorities operated independently of each other and independently of the DNS.

* * * * *